Nov. 5, 1968   E. MEIER ET AL   3,409,106
ANTI-SQUEAL DISK BRAKE
Filed Dec. 12, 1966   3 Sheets-Sheet 1

ERNST MEIER
HERMANN SEIP
INVENTORS.

BY Ross & Masters

Nov. 5, 1968   E. MEIER ET AL   3,409,106
ANTI-SQUEAL DISK BRAKE
Filed Dec. 12, 1966   3 Sheets-Sheet 2

ERNST MEIER
HERMANN SEIP
INVENTORS.

BY Ross & Masters

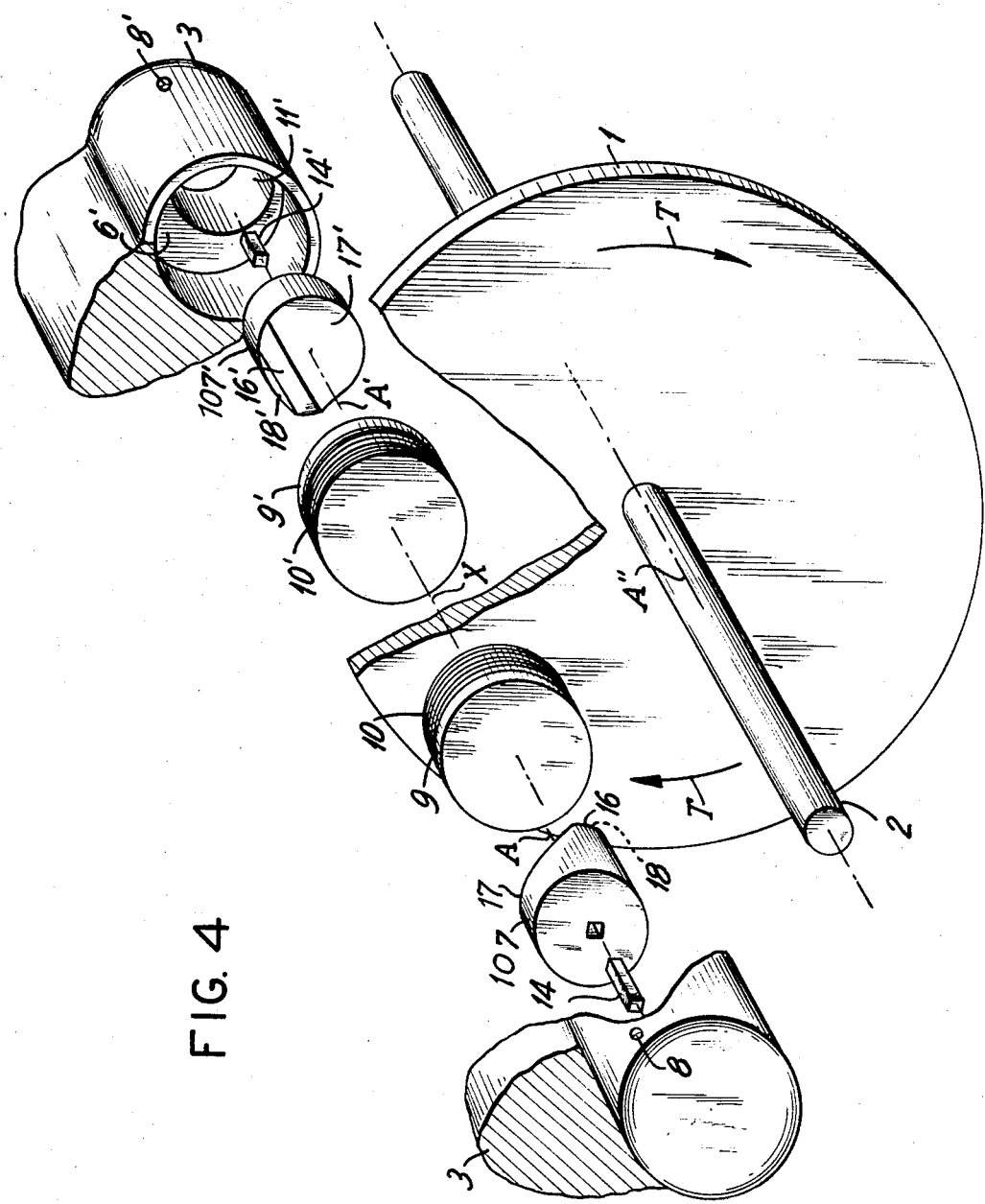

United States Patent Office 3,409,106
Patented Nov. 5, 1968

3,409,106
ANTI-SQUEAL DISK BRAKE
Ernst Meier, Frankfurt am Main-Sindlingen, and Hermann Seip, Bad Vilbel, Germany, assignors to Alfred Teves GmbH, Frankfurt am Main, Germany, a corporation of Germany
Filed Dec. 12, 1966, Ser. No. 601,013
Claims priority, application Germany, Mar. 29, 1966, T 30,798
10 Claims. (Cl. 188—73)

ABSTRACT OF THE DISCLOSURE

A disk brake having a yoke straddling the brake disk and a pair of axially shiftable pistons bearing upon respective brake shoes in the lobes of the yoke, which shoes have at least limited play in the respective lobes, with the location of contact of the pistons with their respective brake shoes being angularly offset about the axis of rotation of the disk and at different radial distances from the axis so that nonuniform wear of the brake linings are countered by off-center application of force thereto by the brake actuating means and squealing of the brake is prevented.

---

Our present invention relates to a disk brake for a rotating shaft such as a wheel-drive shaft or axle of an automotive vehicle.

A problem in the design of disk brakes, particularly disk brakes with a U-shaped yoke or chordal housing supported by one lobe or flange, is the avoidance of squealing brake noises in operation and uneven wear of the brake lining with consequently shortened life of the same.

Generally the lobes of the brake straddle a disk which is keyed to (i.e. rotatably entrained by) the shaft and carry lined brakeshoes which are actuated by pistons or like pressure or force-transmitting members.

The linings of these shoes are subjected to unequal abrasive forces when, in the course of their normal use, they clamp the rotating disk between them. The peripheral speed of the disk increases with the radius and accordingly the wear on the lining is greater toward the outer circumference; moreover, the cantilever shape or support of the housing results almost inevitable distortion and "spreading" of the lobes with a consequent change in the attitude of attack of the linings on the disk.

In known brakes the lining pad accordingly assumes a wedge shape, and in conforming to this, the brakeshoe is canted with respect to the surface of the piston during use. Since the piston is relatively firmly aligned in its cylinder walls it is unable to conform to the canting of the brakeshoe with the result that the zone of contact is no longer a surface but a random point which may change with the degree and location of wear. This permits oscillation of the brakeshoe within the limits of its clearances within its guides with the point of contact as a center of vibration. The squealing noises produced by disk brakes have been attributed to this arrangement.

It is an object of our present invention to provide a brake system obviating the above-mentioned difficulties. It is a further object of our invention to provide a brake system whereby lining wear is equalized over the entire surface and the life of the linings is prolonged.

These objects and others which will be apparent hereinafter are realized, pursuant to the present invention, by locating opposing cylinders in the lobes of the housing off center, and further providing the pistons with bearing faces shaped to confront the brakeshoes at preselected zones of contact.

Advantageously, the pistons are so located in the lobes that the piston in the supported lobes is situated downstream with respect to the rotation of the disk and has a contact point at a greater radial distance from the axis of the disk than the other piston. This other piston is located upstream with respect to the rotation of the disk and has a contact point at a lesser radial distance.

The pistons may, moreover, be prevented from turning out of position by a guide which fixes their angular position relative to the housing but permits axial displacement.

The above and other objects, features and advantages of the present invention will become more readily apparent from the following description, reference being made to the accompanying drawing in which:

FIG. 4 is an exploded view, in perspective of another embodiment; and

Figure 1:
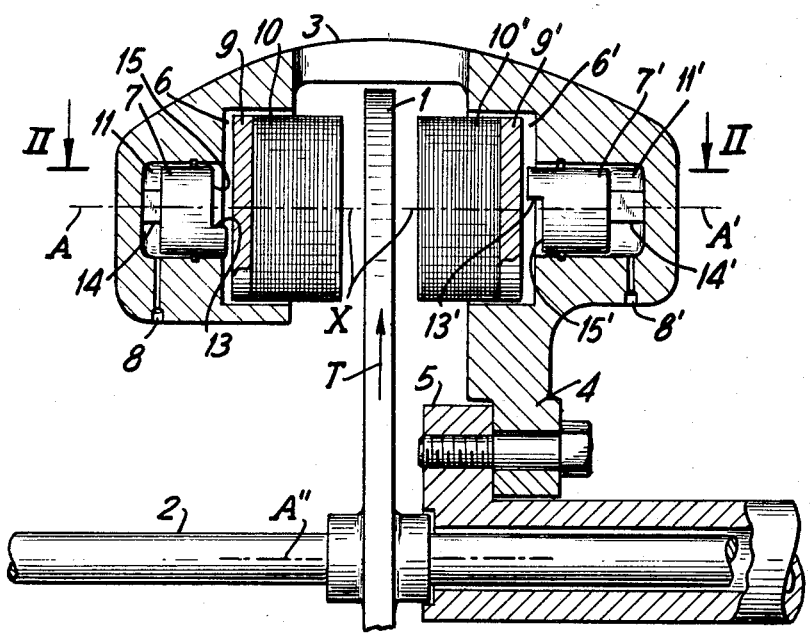
FIG. 1 is a partial side view of a brake according to the invention, in axial section.

In the drawing we show a disk 1 keyed to a shaft 2, having an axis A″, which may be a wheel axle of an automotive vehicle not further illustrated. A brake housing 3 straddles the periphery of disk 1 and is fixed relatively thereto by a flange 4 bolted to an axle housing 5. The lobe or side of the brake bearing flange 4 is known hereinafter as the "fixed" lobe and has parts similar to those of the cantilevered lobe or side identified by corresponding, but primed, reference numerals.

Figure 2:
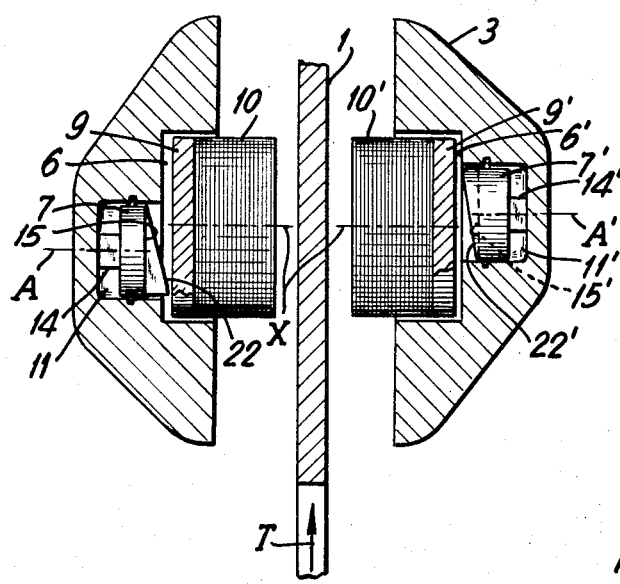
FIG. 2 is a section along the line II—II of FIG. 1.
Figure 3:
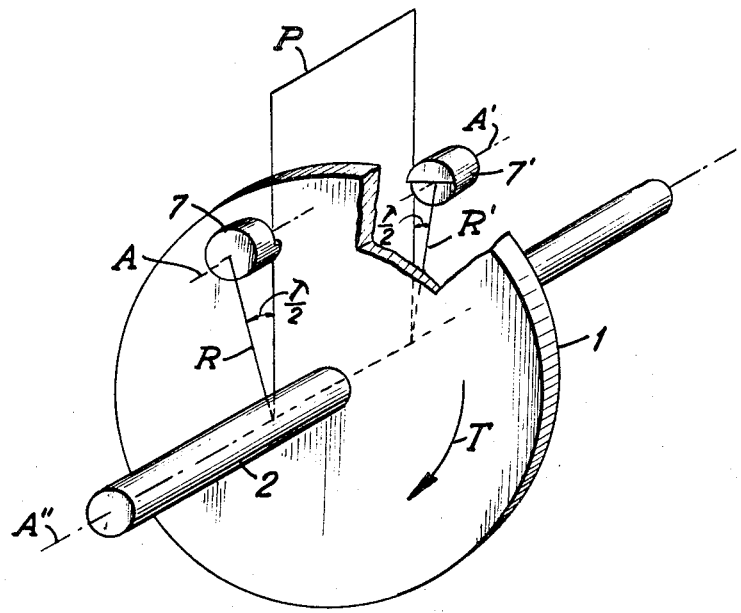
FIG. 3 is a symbolic diagram showing the various relationships involved in this invention.

Housing 3 forms axially aligned guide cups 6, 6′ having a common axis X (FIG. 2) parallel to axis A″, the open ends of which oppose each other and face the opposite sides of disk 1 respectively. Guides 6, 6′ are provided with respective cylinders 11, 11′, whose open ends are oriented toward the disk 1. Axes A, A′ of cylinders 11, 11′ are parallel to and radially equidistant from the axis A″ of disk 1 (FIG. 3) and the planes of the respective radii R, R′ are angularly offset one from another by the angle λ as shown in FIG. 3, here referred to as an intermediate plane P determined by axis X and axis A″.

Cylinders 11, 11′ are provided with axially sliding pistons 7, 7′, prevented from rotation by guides 14, 14′ and responsive to fluid actuating medium admitted through ports 8, 8′. The fluid-actuating means 11, 11′ etc. is energized by a foot pedal and master cylinder not shown as is common in automotive-brake systems.

The engagement faces 15, 15′ of pistons 7, 7′ are provided with steps 13, 13′ forming raised surfaces 22, 22′ which are further raked from a high zone to a low zone. The angular offset of the axes A, A′ locates the conforming pistons 7, 7′, each coaxial with its respective cylinder, such that piston 7 is located upstream with respect to the rotating periphery of disk 1 in the sense of arrow T and piston 7′ is located downstream.

The high edges of raked surfaces 22, 22′ bear upon brakeshoes 9, 9′ and, upon actuation, shift the shoes toward each other within guides 6, 6′ so that brake linings 10, 10′ thereon clamp disk 1 frictionally therebetween.

Another embodiment is shown in FIG. 4 wherein the pistons 107, 107′ are represented as having contact faces with flat ridges 16, 16′, raked from a high point on one side of the circumference to a low point on the other, describing substantially a chord; the ridge has planar flanks (e.g. 17′ and 18′) of unequal size extending obliquely toward the base of the piston from the edges of ridge 16, 16′ and intersecting the cylindrical circumference from the aforesaid high point to a low point. Pistons 107, 107′ are situated in their respective lobes with the small flanks 18, 18' presented to the upstream side of the rotating periphery of disk 1.

Figure 5:
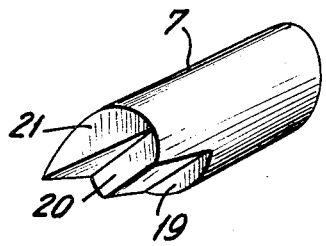
FIGS. 5 and 6 are perspective views of other piston configurations applicable to this invention.

Another embodiment is shown in FIG. 5 in which piston 7 is provided with three segmental surfaces 19, 20 and 21, the latter being raked from a high to a low point.

Figure 6:
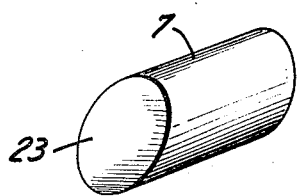

Still another embodiment is shown in FIG. 6 in which the bearing surface is designated as ellipse 23 formed by a plane intersecting the cylinder at an angle oblique to the cylinder axis.

In the operation of the brake the thrust against the brakeshoes 9, 9' by pistons 7, 7' is, according to our invention, so arranged that only a small portion of each piston surface, for instance 10 to 15 millimeters of a leading edge, depending upon the size of the piston, engages its respective brakeshoe and does so in an offset manner. Accordingly the free lobe piston contact is not only upstream relative to the rotation of the disk, but is at a point of smaller radius on the disk than is the opposing piston contact.

The wearing tendency of the brake lining in the free lobe is at a maximum at the greatest disk radius due to the greater peripheral speed of the disk and correspondingly at a minimum at the point of least radius. A wedge-shaped lining pad is accordingly formed after a period of operation, being thickest at the radially inner edge. The axial projection of the offset piston thrust, together with the allowable play of the brakeshoe within the cup directly opposes this uneven wear and provides an even seating of the brake lining against the disk.

In the fixed lobe the above effect of higher peripheral speed is unexpectedly overshadowed by the additional effects of the inevitable spreading and distortion of a cantilevered U-shaped or chordal housing under clamping pressure. In this case the wear of the lining is opposite to that normally anticipated, the wedge forming with the thickest end at the more remote radial position. Again, according to the invention the greater radial placement and downstream position of the line of thrust from the fixed lobe piston opposes this uneven wear.

Our invention obviously permits the brake lining to wear evenly, whereby the brakeshoe surface, since it does not cant, maintains a secure engagement with the piston face. Further, as wear progresses, the thrust point on the brakeshoe back is localized to a relatively small area and does not wander uncontrolled about the surface of the piston as wear points develop on the lining.

This compensation for a radially varying peripheral speed and a distortion of the housing during clamping has the advantageous result that the life of the lining is extended and squealing of the brakes is avoided.

The invention described and illustrated is believed to admit of many modifications within the ability of persons skilled in the art, all such modifications being considered within the spirit and scope of the appended claims.

We claim:

1. In a disk-brake system having a support, a brake disk rotatable relatively to said support about an axis generally transverse to the braking surfaces of said disk, a brake yoke having lobes straddling said disk over a portion of the periphery thereof and having one lobe secured to said support at one side of said disk, a pair of brake shoes confronting said surfaces of said disk and axially shiftable in respective lobes of said yoke into engagement with said disk for braking the rotation of said disk relative to said yoke, said shoes being received with at least limited play in said lobes, actuating means including a piston carried by each of said lobes bearing on rear faces of said shoes for urging same into engagement with said disk, the improvement wherein said pistons bear upon said rear faces of said shoes at locations radially offset from one another with respect to the axis of rotation of said disk, said shoes being aligned with one another in the direction of said axis and being engageable with coextensive areas of said surfaces, the axes of said pistons being angularly offset from the axis of rotation of said disk.

2. The improvement defined in claim 1 wherein said yoke has an incoming side and an outgoing side with respect to the sense of rotation of said disk and said locations are angularly offset from one another about said axis with said location of said one lobe being closer to said incoming side and said location of the other lobe being closer to said outgoing side.

3. The improvement defined in claim 1 wherein said one of said lobes is provided with a flange secured to said support, said brake system being provided as a wheel brake for an automotive vehicle, said flange being located relatively inwardly upon said vehicle and said other lobe being located relatively outwardly thereon, said locations being formed by contact edges of substantially 10 to 15 mm. in length, said actuating means further comprising respective hydraulic cylinders formed on the respective lobes with said pistons being movable in said cylinders while forming said edges upon contact with said brake shoes.

4. The improvement defined in claim 1 wherein said pistons are formed at their ends juxtaposed with the respective faces of said brake shoes with contact ridges engageable with said faces at said locations, said ridges of said pistons being offset from the axes thereof.

5. The improvement defined in claim 4 wherein each of said ends of said pistons is formed with at least one flank leading away from the respective ridge and including an acute angle with the respective face of the corresponding brake shoe.

6. The improvement defined in claim 5 wherein a pair of such flanks extend away from each of said ridges and are of different widths, the wider flank of the piston of said one lobe being disposed proximally to the incoming side of said yoke and the side flank of the piston of the other lobe being disposed relatively close to the outgoing side of said yoke.

7. The improvement defined in claim 4 wherein said ends of said pistons are stepped to form said ridges.

8. The improvent defined in claim 4 wherein said ridges are raked away from said locations.

9. The improvement defined in claim 4, wherein said ridges are formed by beveling said ends of said pistons.

10. The improvement defined in claim 9 wherein said ends of said pistons are each formed with ellipses in respective planes oblique to the respective axes.

References Cited

UNITED STATES PATENTS

| 2,926,757 | 3/1960 | Armstrong | 188—73 |
| 3,166,159 | 1/1965 | Burnett | 188—73 |
| 3,184,005 | 5/1965 | Thirion. | |

MILTON BUCHLER, *Primary Examiner.*

G. E. A. HALVOSA, *Assistant Examiner.*